United States Patent
Preisinger (10) Patent No.: US 10,579,034 B2
(45) Date of Patent: Mar. 3, 2020

(54) CONTROL SYSTEM FOR ELECTRICALLY CONTROLLED SYSTEMS

(71) Applicant: KEBA AG, Linz (AT)

(72) Inventor: Gernot Preisinger, Linz (AT)

(73) Assignee: KEBA AG, Linz (AT)

( * ) Notice: Subject to any disclaimer, the term of this patent is extended or adjusted under 35 U.S.C. 154(b) by 0 days.

(21) Appl. No.: 16/098,917

(22) PCT Filed: May 5, 2017

(86) PCT No.: PCT/AT2017/060118
§ 371 (c)(1),
(2) Date: Nov. 5, 2018

(87) PCT Pub. No.: WO2017/190171
PCT Pub. Date: Nov. 9, 2017

(65) Prior Publication Data
US 2019/0086895 A1 Mar. 21, 2019

(30) Foreign Application Priority Data

May 6, 2016 (AT) .................................. 50420/2016

(51) Int. Cl.
*G05B 19/042* (2006.01)
*G05B 9/02* (2006.01)
(Continued)

(52) U.S. Cl.
CPC ........ *G05B 19/0428* (2013.01); *B25J 13/006* (2013.01); *B25J 13/06* (2013.01);
(Continued)

(58) Field of Classification Search
CPC ......... B25J 9/1674; G05B 2219/39447; G05B 2219/40218; G05B 2219/13093; G05B 2219/50198; H01H 3/022; H01H 9/20
See application file for complete search history.

(56) References Cited

U.S. PATENT DOCUMENTS 2,887,677 A * 5/1959 Arrasmith .............. G08B 25/14
340/963
3,787,731 A * 1/1974 Herr ....................... H02H 11/00
307/115
(Continued)

FOREIGN PATENT DOCUMENTS

DE 10 2014 002 982 A1 8/2014
DE 10 2015 009 524 A1 2/2016
(Continued)

OTHER PUBLICATIONS

International Search Report of PCT/AT2017/060118, dated Sep. 13, 2017.

Primary Examiner — Darrin D Dunn
(74) Attorney, Agent, or Firm — Collard & Roe, P.C.

(57) ABSTRACT

A control system for technical installations includes at least one electronic manual operator-control instrument that can be carried and used mobilely by an operator-control person for influencing and observation of the control system or a connected technical installation. The instrument has a wireless communication interface and a communication interface established via a connecting cable. At least one safety switching element actuated by the person on the manual operator-control instrument can at least terminate potentially hazardous control commands or movement sequences. The hard-wired communication interface includes a contact-based plug interface on the instrument having a first coupling element on the instrument and a second coupling element coupled and decoupled as needed relative to the first coupling element. At least one termination indicator on or in the connecting cable directly in or near the second coupling element can be sensed electronically by a termination-indicator detector.

15 Claims, 2 Drawing Sheets

(51) Int. Cl.
*B25J 13/00* (2006.01)
*B25J 13/06* (2006.01)

(52) U.S. Cl.
CPC ...... *G05B 9/02* (2013.01); *G05B 2219/33228* (2013.01); *G05B 2219/36162* (2013.01); *G05B 2219/50198* (2013.01)

(56) References Cited

U.S. PATENT DOCUMENTS

| | | | | |
|---|---|---|---|---|
| 3,967,192 | A * | 6/1976 | Kellogg | G01R 31/44 324/414 |
| 5,455,733 | A * | 10/1995 | Waggamon | H01H 9/167 307/132 E |
| 5,546,002 | A * | 8/1996 | Hickl | H01H 47/002 324/418 |
| 6,188,225 | B1 * | 2/2001 | Tislaric | G01R 31/3272 324/422 |
| 6,505,136 | B1 * | 1/2003 | Pieper | G01R 31/3277 324/422 |
| 6,882,155 | B2 * | 4/2005 | Lazzaro | H01H 47/002 324/418 |
| 7,111,218 | B2 * | 9/2006 | Egger | G01R 31/2617 324/750.3 |
| 8,081,001 | B2 * | 12/2011 | Hooper | H02H 3/335 324/424 |
| 2002/0091493 | A1 * | 7/2002 | Christopher | G05B 9/02 702/113 |
| 2003/0062494 | A1 * | 4/2003 | Snowbarger | G05B 9/02 251/89 |
| 2004/0032250 | A1 * | 2/2004 | Zappa | B66B 13/22 324/200 |
| 2005/0212522 | A1 * | 9/2005 | Finlay, Sr. | G01R 31/14 324/509 |
| 2008/0157775 | A1 * | 7/2008 | Finney | G01R 31/3277 324/418 |
| 2008/0188985 | A1 * | 8/2008 | Sakano | B25J 9/1648 700/260 |
| 2009/0040666 | A1 * | 2/2009 | Elms | H02H 1/0015 361/42 |
| 2014/0244034 | A1 | 8/2014 | Toda | |
| 2016/0031077 | A1 | 2/2016 | Inaba et al. | |

FOREIGN PATENT DOCUMENTS

| | | |
|---|---|---|
| JP | H07-65908 A | 3/1995 |
| WO | 2017/072246 A1 | 5/2017 |

* cited by examiner

Fig. 2

CONTROL SYSTEM FOR ELECTRICALLY CONTROLLED SYSTEMS

CROSS REFERENCE TO RELATED APPLICATIONS

This application is the National Stage of PCT/AT2017/060118 filed on May 5, 2017, which claims priority under 35 U.S.C. § 119 of Austrian Application No. A50420/2016 filed on May 6, 2016, the disclosure of which is incorporated by reference. The international application under PCT article 21(2) was not published in English.

The invention relates to a control system for technical installations, as is specified in claim 1.

A technical installation is to be understood as machines, machine components, industrial robots, handling aggregates or manipulators, fabrication systems, assembly installations and other installations with automated movement or process functions.

In industrial practice, it is customary to operate technical installations or machines with positionable or movable machine components by means of transportable manual operator-control instruments. A substantial advantage of such mobile manual operator-control instruments is the capability of a location or position change for the respective operator-control person. For example, an operator-control person is able to assume a respectively favorable observation position without problem, which in many cases permits a more efficient operator control or controlling of machines than is possible with input instruments mounted in locally fixed manner. In particular, a mobile manual operator-control instrument permits a direct observation of a reaction to a command input.

A command input respectively executed by the operator-control person on the manual operator-control instrument is then mostly communicated for corresponding implementation to a controller for the machine, which then initiates the corresponding function on the machine. Depending on construction, such manual operator-control instruments have input options for operator-control functions of the most diverse type. Frequently, at least one manually actuatable safety switching element is also present, by means of which, upon actuation, an immediate transfer of the machine or of machine components into a safe state may be initiated or ordered. A common and widely known example of such a safety switching element is an Emergency Stop or Emergency Off switch, usually identified in red and yellow color, or a Machine Stop switch, which acts in technically comparable manner but for normative reasons is configured visually differently.

In industrial practice, the operation of machines is executed or controlled in automated manner most of the time by one or more appropriately programmed controllers.

A human operator-control person is needed only in special or exceptional cases. This may be the case, for example, when unusual machine operations must be executed that the controller(s) of the machines cannot execute without human instruction. Examples for this are operator-control actions during the elimination of operating faults, the undertaking of maintenance tasks, during setting up after a tool change or during teaching of robots or the building up of new fabrication processes.

In industrial operating environments in which a multiplicity of machines are often being operated that are similar and that normally run completely automatically, it is therefore advantageous or desirable for cost reasons when only comparatively few manual operator-control instruments, for example one manual operator-control instrument per service technician, can be coupled and used alternately and only in the respective case of need with the control device or devices of the machine(s).

For this purpose, the control system for the respective technical installation or machine must be provided with a communication interface for temporary linking of the manual operator-control instrument with at least one control or evaluation device of the respective machine. If a manual operator control or observation of the machine using data technology is not necessary, the manual operator-control instrument may then be released again from the communication interface of the machine and, for example, used for manual operator control or observation of another machine. To ensure that an ongoing operation of a technical installation or machine is not impermissibly disturbed by coupling or decoupling of a manual operator-control instrument and that a time-consuming shutdown and restart of the machine can be avoided in the course of a coupling or decoupling process of the manual operator-control instrument, the control system and the manual operator-control instrument must interact for a coupling or decoupling at any time and be technically provided for the purpose. This is also known as a hot-plug capability of the manual operator-control instrument or of the higher-level control system.

In connection with a safety switching element situated on the manual operator-control instrument in the manner of an Emergency Off switch, a series of special requirements is applicable in this connection. Such an Emergency Off switch is usually provided with two redundantly constructed, positively opening contacts, which are integrated in an electrical circuit, especially in a so-called safety switching circuit, which is monitored if applicable by a safety monitoring device of the machine and likewise is constructed in doubly redundant manner. Usually, such a safety switching circuit therefore comprises two monitored electrical circuits, in each of which one normally closed contact of the Emergency Off switch is integrated. Further such normally closed contacts of other safety switching elements may be disposed in series with these normally closed contacts of the Emergency Off switch, such as, for example, of limit position switches for monitoring of closed protective doors or the like. As soon as one of the electrical circuits is opened or broken, i.e. when one of the Emergency Off switches is actuated, for example, this is registered by the safety monitoring device that if applicable is implemented in the machine, which safety monitoring device then transfers the machine into a safe state without delay, i.e. usually shuts it down immediately. Instead of the implementation of a special, typically programmable safety monitoring device, it is also conceivable, for relatively simple technical installations, upon an opening or interruption of the at least one safety switching circuit, to interrupt the energy supply to drive units, which may be done, for example, by means of at least one power switch or a so-called contactor.

Such a shutdown of a machine or technical installation is necessary in a real hazard situation, in order to avoid hazards for life and health of people. However, this abrupt or else controlled shutdown sometimes represents a quite considerable impairment for the operating workflow, because thereby it may lead to restart processes of the machine that are often tedious and in some cases to problems of series stability or of fabrication quality, until all operating parameters have again reached their optimal value.

If a manual operator-control instrument is now decoupled from a technical installation or machine and thus the safety switching circuit or its typically redundantly constructed electrical circuits are interrupted at the plug or communication interface between the stationary control device and the manual operator-control instrument, after the Emergency Off switch on the manual operator-control device has been integrated into the safety switching circuit or has been fitted serially into the safety switching circuit via the connecting cable between the manual operator-control instrument and the stationary control device, the safety switching circuit must alternatively be bridged immediately relative to the communication interface that has been intentionally separated, or the safety monitoring device must be deactivated relative to the respectively decoupled or released Emergency Off switch, in order to prevent an undesired shutdown of the technical installation or machine.

DE102015009524A1 describes a control system of the class in question for technical installations, especially for a robot. Therein a stationary controller and a mobile manual operator-control instrument can be connected to one another using control technology or separated from one another using control technology via a cable connection with corresponding plug couplings. The mobile manual operator-control instrument is provided with an Emergency Stop knob for interruption of the drive current for the robot or for transferring the robot into a safe state. The stationary control device is provided with a connecting/separating switch, which is actuated manually when the mobile manual operator-control instrument is connected to the stationary control device or is separated therefrom. In this way, it is intended that a robot controller be achieved that is able to ensure the safety of an operator controller and is in the position to reduce operating costs by avoiding an unnecessary Emergency Stop of a robot.

In DE102014002982A1, a control system with a connection-state monitoring unit is disclosed that monitors the connection state, established electrically or using signal technology, between a manual operator-control instrument and a terminal device and, upon decoupling of a manual operator-control instrument, simulates the decoupled Emergency Off switch in a manner equivalent to signal technology by a switching operation in the terminal point and couples the machine into the safety circuit. However, it is not possible by a connection-state monitor alone to distinguish between a separation, intended by the operator-control person, of the manual operator-control instrument at the provided coupling point and a possible severing of the cable as the consequence of an accident. In the case of intended detachment of the manual operator-control instrument, therefore, either an additional action must be taken by the operator-control person in order to technically establish plausibility of the intended connection break and to prevent tripping of the safety switching circuit or circuits, and/or plug-type bridging elements must be inserted for establishment of such plausibility after the detachment of the manual operator-control instrument at its position, and simultaneously the permanent existence of an only half-plugged state must be excluded.

Other prior art solutions provide one or more switching contacts in the cable-side part of a plug connection, in order to sense the detachment or establishment of the coupling using signal technology and to permit overriding of the action of the Emergency Off switch in the decoupled state. JPH0765908 A discloses such a solution with switching contacts separating in electrically leading manner. Such solutions indeed simplify the handling during decoupling and coupling of a manual operator-control instrument, by the fact that no additional plausibility-establishing operator-control action has to be taken, although in this case the problem remains that the plug connection may also be in an undefined, half-plugged state, i.e. in a state in which a plug device is indeed held mechanically in the corresponding receptacle but at least not all contacts are contacting properly. In such a case, an operator-control person could assume, on the basis of the apparently existing coupling of the manual operator-control instrument to the machine or to the control device of the machine, that the function of the Emergency Off switch is presumably also assured. In an emergency situation that develops surprisingly, such an Emergency Off switch would be operated unsuccessfully. It is only by the absence of action that the person would be motivated to look for further emergency off switches installed in fixed manner in the region of the machine and to actuate them, whereby valuable time would be lost.

The task of the present invention was to overcome these disadvantages of the prior art and to provide an improved control system for the safe control or operator control of technical installations.

This task is accomplished by a control system according to the claims.

The proposed control system provides safe control of a technical installation or machine and comprises at least one stationary control device with input and output interfaces for establishment of line connections to a technical installation to be controlled.

In addition, at least one electronic operator-control instrument that can be carried by an operator-control person is provided for influencing and observation of workflows and states, using control technology, of the control system or respectively of a technical installation connected thereto. Such a manual operator-control instrument is provided with a wireless communication interface using control technology and also, via a connecting cable, with a communication interface that can be established using control technology, with which communication interfaces an integration of the manual operator-control instrument into the control system using data technology is respectively possible.

Furthermore, at least one safety switching element that can be actuated by an operator-control person, for example a so-called Emergency Off switch and-or a three-stage enabling switch, is formed on the manual operator-control instrument, which safety switching element is provided for the execution and/or termination of control commands or movement sequences that are potentially critical to safety.

The control system further comprises a safety switching circuit that is closed in the normal state, which safety switching circuit can be transferred into an interrupted or opened state upon occurrence of a potentially hazardous state or to avert a hazardous state. In this state, the safety switching circuit is designed or provided for disconnection of potentially hazardous movements or sequences of a technical installation or for establishment of a safe state of a technical installation connected using control technology.

This hard-wired communication interface using control technology comprises a contact-based plug interface on the manual operator-control instrument, which plug interface is provided with a first coupling element on the manual operator-control instrument and a second coupling element that can be coupled and decoupled as needed relative to the first coupling element, which second coupling element is constructed on the connecting cable. Thereby the manual operator-control instrument can be separated completely from the connecting cable and in particular employed ergonomically during use of the wireless communication interface using control technology.

It is important that at least one termination indicator is formed on or in the second coupling element directly or in the immediate vicinity of the second coupling element on or in the connection cable, which termination indicator can be sensed electronically by a termination-indicator detecting means of the control system or of the stationary control device.

The control system, especially at least one of the stationary control devices, further comprises a manual operator-control instrument detecting means, which is provided for sensing the presence or non-presence of a connection, using control technology, of a manual operator-control instrument to the control system. The recognition of a presence or non-presence of a connection, using control technology, of a manual operator-control instrument to the control system may be achieved, for example, by a sensing or evaluation of the electrical energy consumption, especially by a current measurement, or implemented by evaluation of the presence or non-presence of a communication using data or signal technology.

In this connection, it is important that the control system, especially the stationary control device or a monitoring electronic unit implemented therein, upon sensing of a non-presence of a connection, using control technology, of a manual operator-control instrument, and upon simultaneous sensing of a termination indicator, recognizes a separation, undertaken intentionally by an operator-control person, of the contact-based interface on the manual operator-control instrument, or thereby an intentional separation of the signal links via the connecting cable is assumed by the control system. Thereupon, in the course of unplugging of the manual operator-control instrument, the safety circuit is bridged or held closed by the safety system, especially by at least one stationary control device or a monitoring electronic unit implemented therein, as a substitute for the decoupled or ineffective safety switching element on the manual operator control instrument that is to be decoupled or has just been decoupled. In particular, it may be provided that, in such a case, the control system, for example a stationary control device or a separate monitoring electronic unit, transfers the safety switching circuit, for example on the coupling point of the manual operator-control instrument, directly into the closed state, in order to avoid an unwanted shutdown of the technical installation. Alternatively to this, the control system, especially at least one stationary control device or a monitoring electronic unit, may be provided for activation of a substitute or parallel contact to the safety switching element on the manual operator-control instrument, especially to transfer such a substitute or parallel contact into the closed state, when the connecting cable is unplugged from the manual operator-control instrument. These cited actions are taken only when the safety switching element on the respective operator-control instrument was in its non-actuated state immediately before the unplugging of the connecting cable from the manual operator-control instrument, especially had been present in the quiescent state.

One advantage of the features according to the invention lies in the fact that thereby the control system, especially at least one of the stationary control devices or a monitoring electronic unit implemented separately therein, is able to distinguish the intentional decoupling of the manual operator-control instrument from the connecting cable, especially at the plug interface between the manual operator-control instrument and the connecting cable, from a cable break due to fault or accident, without requiring an explicit and additional action by the operator-control person to establish plausibility. On the one hand, therefore, a particularly functionally reliable or functionally safe construction is created, which in addition offers good handling comfort. Because no manual actions of any kind by the operator-control person to establish plausibility are needed in order to be able to distinguish an intentional unplugging operation from a fault-induced loss of the coupling, a high practical benefit and a high user friendliness are also achievable. Beyond this, the training need for use of the manual operator-control instrument can be as little as possible, since no special hand movements or actions of any kind must be undertaken when the manual operator-control instrument is unplugged from the connecting cable during ongoing operation. Accordingly, upon recognition of an intentional separation of the connecting cable from the manual operator-control instrument, the control system or the implemented monitoring electronic unit is able, in automated manner, to bridge the safety switching circuit electrically, especially the Emergency Off circuit, i.e. to detect it. Otherwise the safety switching circuit may be opened in automated manner and thus the technical installation shut down safely on the basis of an emergency or fault situation.

In this connection, it is important that the existence of an intentional separation of the cable connection between the manual operator-control instrument and the remote coupling point be recognized in automated manner with high reliability and be distinguishable technically safely from an interruption as a result of a defective or destroyed cable. In particular, the functional test of the connecting cable takes place starting from the local control device or monitoring electronic unit via the corresponding connecting cable in the direction of that coupling element which is provided for coupling to a manual operator-control instrument. Due to the automated test of a connection that is intact or with high probability is intact in the direction of the coupling element for the coupling to a manual operator-control instrument, the advantage is also achieved that this test takes place completely independently of the presence of a plugged-in or unplugged manual operator-control instrument. In particular, the checking takes place starting from sides of the stationary units, for example in the manner of a terminal box with the integrated stationary control device or an integrated monitoring electronic unit.

It is also of particular advantage that this solution, in the case of a plugging or unplugging operation on the part of the manual operator-control instrument, the acknowledgment of the unplugging operation by a prior or subsequent operator-control action is completely unnecessary. This would otherwise be necessary in principle, for safety-related reasons, for establishment of plausibility and for distinguishing of an intentional unplugging operation from a cable break. Thus neither operator-control actions in the form of manual acknowledgments or key actuations are necessary, nor is it necessary for the operator-control person to couple or decouple diverse bridging plugs.

In particular, it is possible, due to the terminationn-indicator detecting means provided according to the invention, to detect a cable interruption, especially a cable break or a cable cut, reliably and without delay, without the need for a prior or subsequent action by the operator-control person to establish plausibility. The "hot unplug" capability, which is particularly user-oriented or exhibits high user-friendliness, thus requires no actuation of a safety element and also no plug-changing operation of an auxiliary or substitute bridging plug. In this way, a high user friendliness is achieved, since not even any actions that induce stress or are subject to time pressure are necessary, which would have to be performed by the operator-control person before the technical installation is shut down automatically for safety-related reasons, especially is placed in the Emergency Off state.

The features according to claim 2 are also advantageous, since thereby it can be deduced in automated and reliable manner whether a partial or complete cable break exists. Especially in the case of differing results on the part of the manual operator-control instrument detecting means and the termination-indicator detecting means, it is to be assumed that a fault exists in the connecting cable. This is the case in particular when the termination-indicator detecting means is non-informative, while the manual operator-control instrument detecting means assumes a connection of a manual operator-control instrument. To this extent, it is possible thereby to ascertain cable or wire breaks in the connecting cable and/or to disallow a use of incompatible or unscheduled connecting cables. The corresponding fault message may then lead to a disabling of the execution of control commands that are potentially critical to safety or even to a shutdown of the installation via the safety circuit—in a manner comparable with an Emergency Stop signaling.

One advantage of the features according to claim 3 lies in the fact that an extremely comfortable integration of the manual operator-control instrument into the control system is created. In particular, thereby the at least one safety switching element of the manual operator-control instrument is integrated in automated manner into the safety switching circuit or is coupled functionally effectively therewith. However, this integration takes place only when the connecting cable is error-free with high or extremely high probability, so that in hazardous or emergency states a direct transformation to a safe state is made possible by actuation of the safety switching element.

Expedient alternative embodiments for the termination indicator are specified in claim 4. The advantage of an electrical connecting jumper lies in the fact that it can be implemented particularly cost-effectively and that nevertheless a high detection reliability can be guaranteed. One advantage of the connection of an ohmic resistor lies in the fact that thereby short circuits that may develop between wires of the connecting cable can also be detected, when the resistance value deviates from the expected nominal value. The integration of the shield of the connecting cable may possibly be practical, since then not only is it possible to check whether the connecting cable is interrupted but also, quite specially, the shielding of the cable is checked that is usually routed via different contact connections than are the signal conductors. Such a check of the cable shield may be advantageous, since it of importance with respect to the suppression of electromagnetic interfering influences.

The features according to claim 5 are also expedient. Because the termination indicator or the bridging element is then formed in the second coupling element or in the corresponding end portion of the connecting cable by a part with frequency-dependent and/or nonlinear transmission behavior, its presence can be ascertained by an appropriately configured test signal together with testing of the transmission behavior. Thereby not only can interruptions of the cable be detected but so also can short circuits, which may be caused, for example by a squashing or a pinching of the cable, whereby the reliability of the checking is further increased. The test signal, which is routed via the bridge-type termination indicator, may then contain alternating current components of one or more frequencies or alternating frequencies. These actions permit, moreover, the technically reliably distinguishable identification of differently constructed cables despite mechanically compatible plugs, for example in terms of the possible transmission rates for visualization data or of the permissible maximum length of a cable at a particular plug point in view of safety considerations.

Erroneous manipulations on the connecting cable that could lead to faults or problems during startup are excluded by the features according to claim 6. Thus delays in startup caused by the user can be excluded.

The features according to claim 7 are also of advantage. In particular, the detectability of the termination indicator is not dependent on whether the corresponding coupling element on the manual operator-control instrument is plugged or unplugged. A detectability of the termination indicator is therefore possible at any time and independently of the coupling or decoupling of a manual operator-control instrument. Under some circumstances, functionally unstable electromechanical actuations, which depend on the coupling state of the plug interface, are likewise avoided thereby.

Due to the features according to claim 8, it is possible to remove the connecting cable entirely and relatively quickly from the control system. A particular advantage of this feature lies in the fact that therewith the danger of damages, as may occur in industrial environments, is suppressed. In the same way, the danger of accidents or of a hindrance due to cables lying around is reduced.

In this connection, the improvement according to claim 9 is also of advantage, since thereby it can be determined on the part of the stationary control device or of the implemented monitoring electronic unit whether a connecting cable is basically connected. For the case that a cable plug of a connecting cable is detectable but the termination indicator is not detectable, it may be assumed on the part of the control system that the connecting cable is either damaged or is not scheduled for a use in connection with the control system or has not been released for the purpose.

Due to the features according to claim 10 or 11, it is possible to integrate the features according to the invention into existing control systems without problems. In particular, it is possible thereby for the mobile manual operator-control instruments to be connected in simple manner to already existing control systems or to control systems of any manufacturers whatsoever. In particular, it is possible thereby to add the corresponding monitoring electronic unit as needed to the control system and thus to achieve a kind of upgrade, which can be executed in a manner that is practical and as cost-effective as possible, without the need to replace the complete control system.

Thereby the features according to claim 12 are also of advantage, since therewith the safety functions of the manual operator-control instrument, especially the availability of the safety switching element, can be guaranteed to a great extent. Thus, in the case of hard-wired integration of the manual operator-control instrument, the controlling or influencing of control functions that are potentially critical to safety is permitted or enabled, without necessitating complicated features using radio technology for the purpose, in order to be able to achieve the required system safety or system reliability. In particular, a kind of "semi-wireless" functionality of a manual operator-control instrument integrated into the control system is created thereby. Among other results, an optimum cost-to-benefit ratio can be achieved thereby. This is the case in particular when the control system is implemented in combination with the features according to claim 13.

In connection with the construction according to the invention, the features according to claim 14 are also of special benefit. Thereby it can be signaled unmistakably and in automated manner whether the safety switching element on the manual operator-control instrument is functionally available or can become functionally effective, or whether it is in an unusable, inactive state. The corresponding features can then be implemented reliably without having to use complicated mechanical distinguishing features or manual actions. The system reliability and also the system safety can also be increased thereby.

According to one expedient feature, this internal illuminant in the safety switching element is designed for the emission of red-colored light. Thereby the functional availability of the safety switching element can be recognized clearly and unmistakably, especially when it exists in a red-colored illuminated state. On the other hand, this safety switching element may be constructed to be weakly translucent or milky, when it exists in its inactive, functionally unavailable state and thus the illuminant is deactivated. This state exists in particular in the case of wireless coupling of the manual operator-control instrument to the control system.

The features of claim 15 are also expedient, since therewith it is unmistakably shown or signaled when the safety switching element on the manual operator-control instrument does not have any functional effectiveness, because the manual operator-control instrument is integrated into the control system via its wireless communication interface and therefore can be used only for observational tasks or parameter assignments that are uncritical to safety.

For better understanding of the invention, it will be explained in more detail on the basis of the following figures.

Therein, respectively in greatly simplified schematic diagrams.

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
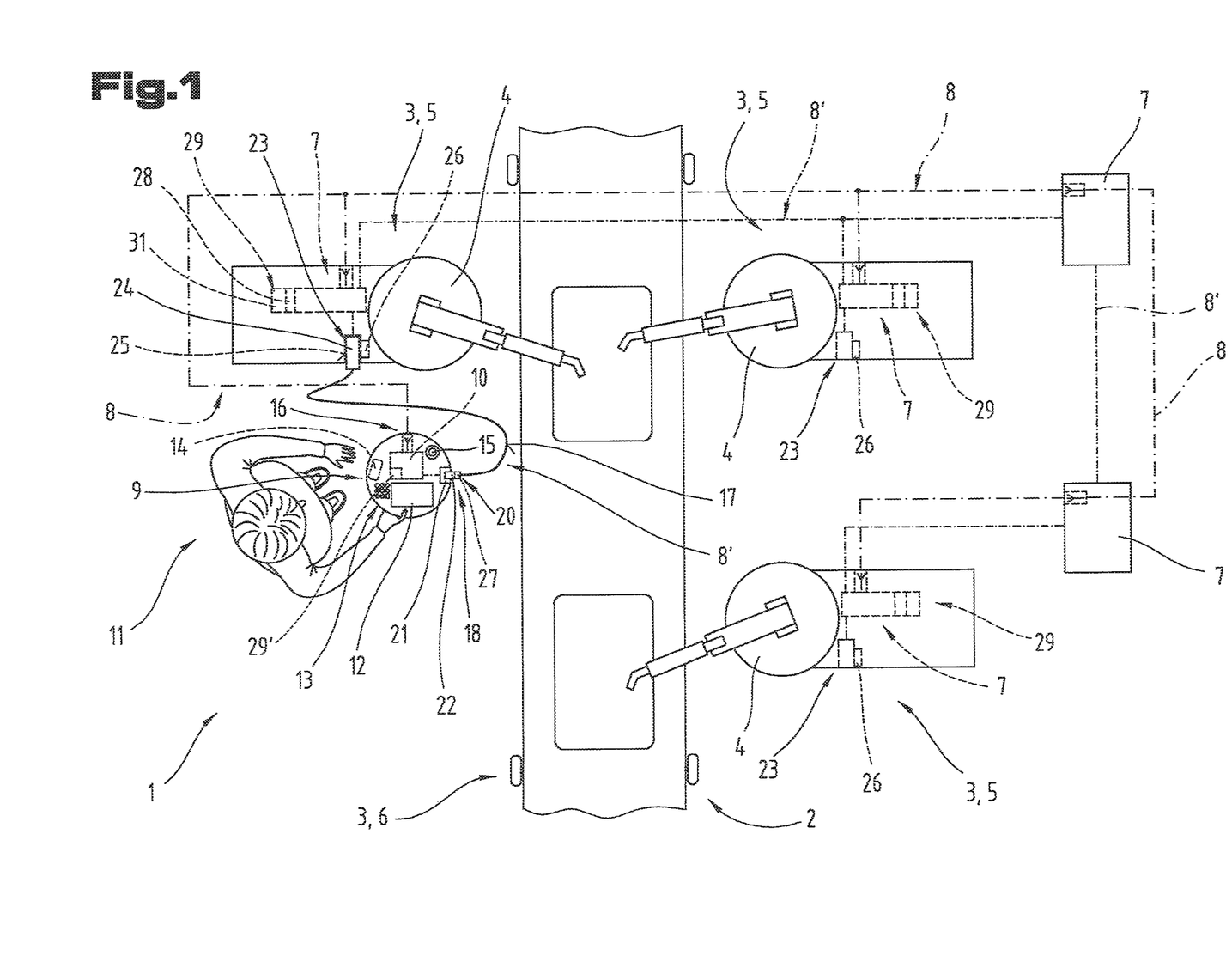
FIG. 1 shows an exemplary embodiment of an electronic control system as well as components of an installation controlled with the control system.

In FIG. 1, components of an electronic control system 1 as well an installation 2 controlled with the control system 1 are illustrated. The technical installation 2 illustrated in sectional view comprises several installation components 3, which in the example according to FIG. 1 may be formed by processing stations 5 comprising industrial robots 4. In principle, a technical installation 2 may comprise any desired, further installation components 3, in order to be able to carry out or execute technical processes, for example fabrication processes, chemical methods and the like in at least partly automated manner. For example, the installation 2 in the exemplary embodiment according to FIG. 1 comprises a transport device 6 for the transport of objects, workpieces, semifinished products and the like between the processing stations 5 or for the supply of objects for the individual processing stations 5.

As is illustrated in FIG. 1, the control system 1 has at least one electronic control device 7, designed to be stationary. As is known in principle, the at least one control device 7 may also be part of a control network having several control devices 7 disposed in decentralized manner, as is likewise indicated schematically in FIG. 1. These individual control devices 7 may be designed or programmed for execution of certain tasks, for example for monitoring and control of the installation 2 or for monitoring and control of certain installation components 3, wherein the control architecture for monitoring and control of the installation 2 may in principle have any desired topologies.

Depending on need, the individual control devices 7, positioned in stationary manner, may be designed for hard-wired communication via communication connections 8' and/or for wireless communication via wireless communication links 8, as is indicated schematically in FIG. 1. Such a wireless communication link 8 may be formed, for example, by a link according to the WLAN or Bluetooth standard or by a standardized radio link for industrial environments.

The control system 1 further comprises at least one portable, mobile manual operator-control instrument 9. The at least one manual operator-control instrument 9 or an electronic control device 10 of the manual operator-control instrument 9 may in turn be linked via a wireless communication link 8 using signal or data technology to one or more of the stationary control devices 7 of the control system 1. The at least one manual operator-control instrument 9 is provided or designed for use by an operator-control person 11, wherein a signal or data exchange between the operator-control instrument 9 and a control device 7 may take place via the wireless communication link 8. Alternatively, or in combination therewith, hard-wired communication connections 8' may also be provided between the individual control devices 7, 10.

In principle, the stationary control devices 7 may be functional control units of an installation 2 or installation components 3, which are used, for example, for implementation of control commands generated in automated manner, or are provided for implementation of control commands input or initiated at the manual operator-control instrument 9. Such control devices 7 may be designed, for example, for activation of actors or drives for certain installation components 3 or for sensing the signals of sensors or position switches. For this purpose, the control devices 7 are provided with input and output interfaces for establishment of line connections to a technical installation 2 to be controlled. Further control devices 7 may also be provided, for example also higher-level control devices 7, which handle in particular logistical workflows, energy-supply workflows or transmission workflows between individual installation components 3 in automated or partly automated manner, as was illustrated by way of example at the right margin of FIG. 1. Preferably, the at least one manual operator-control instrument 9, especially the control device 10 installed therein, can be placed in communication connection, via the wireless and/or the hard-wired communication interface 8, 8', using signal or data technology, with at least one of the stationary control devices 7 of the control system 1.

Within the scope of this document, a transmission of signals or data will also be understood in principle as a supply of signals or data.

Figure 2:
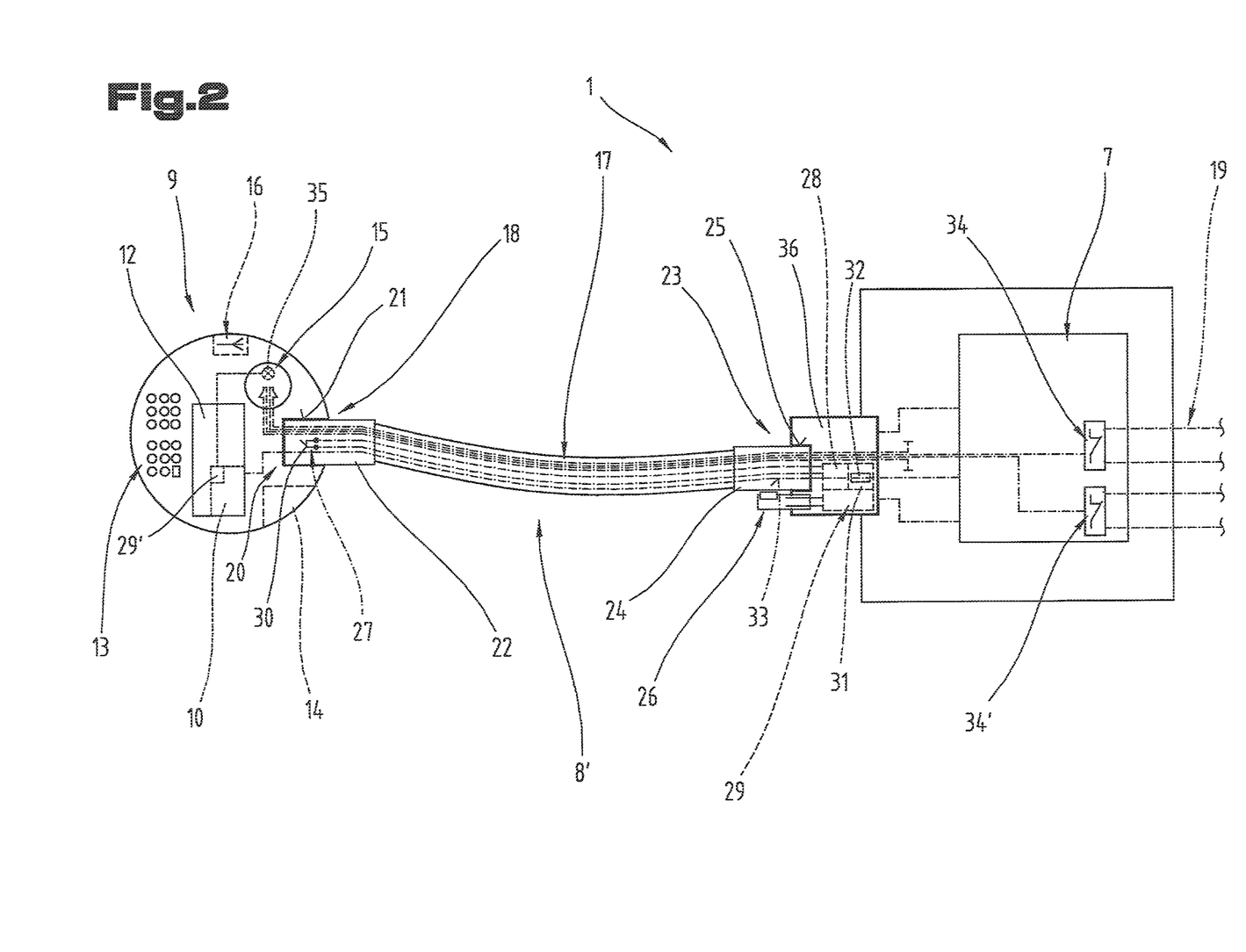
FIG. 2 shows a manual operator-control instrument with a safety switching element, which manual operator-control instrument is provided as needed with a pluggable and unpluggable cable connection for a hard-wired integration into a control system and in addition is provided with a wireless communication interface for wireless integration into the control system.

For display of information or data, the at least one manual operator-control instrument 9 is provided with at least one output element 12, especially at least one display or a touch screen. For input of settings and/or for manual initiation of control commands, the manual operator-control instrument 9 is provided with at least one input element 13, for example pushbuttons, switches, trackballs, a joystick or the like. The respective form of configuration of the output elements 12 and of the input elements 13 of the at least one manual operator-control instrument 9 may then be adapted to the diverse requirements and needs or to the respective purpose of use.

Moreover, for the purpose of an at least temporary stand-alone, electrical power supply, the manual operator-control instrument 9 may be provided with an internal power supply unit 14, which preferably comprises at least one electro-chemical battery. This internal power supply unit 14 is necessary in particular for a purely wireless operation of the manual operator-control instrument 9, i.e. is necessary in the operating state, without terminal, of an energy-supply or data cable, in order to be able to supply the electronic components of the manual operator control instrument 9 with electrical energy independently of a hard-wired power-supply terminal and to operate them. In the case of a connection using signal or data technology only via the wireless communication interface 16, a battery-fed internal power-supply unit 14 is therefore a part of the manual operator-control instrument 9.

At least one of the manual operator-control instruments 9 that can be functionally integrated into the control system 1 is provided with at least one manually actuatable safety switching element 15, with which, upon actuation by an operator-control person 11, it is possible to initiate an immediate shutdown, for example, of the technical installation 2 or of a specific installation component 3, or a transfer of the technical installation 2 or of a specific installation component 3 into a safe state. Such a safety switching element 15 may be formed by at least one so-called Emergency Off or Emergency Stop switch and/or defined by at least one enabling switch with so-called panic switch position.

According to one practical embodiment, the manual operator-control instrument 9 is provided with a wireless communication interface 16 using control technology and also a communication interface 18 that can be established using control technology via a connecting cable 17. With each of these two communication interfaces 16, 18, an integration, using signal or data technology, of the manual operator-control instrument 9 into the control system 1 is possible, wherein the scope of the control commands available on the manual operator-control instrument 9 is dependent on which of the communication interfaces 16, 18 will be used specifically for the integration using signal or data technology or whether both will be used simultaneously. For an increase of the safety during the operator control or influencing of technical installations 2 using control technology, from which potential hazards for people or serious damage to the technical installation 2 or to objects or workpieces to be processed may result, at least one safety switching element 15 already mentioned in the foregoing is provided on the manual operator-control instrument 9.

According to one expedient feature, it is then provided that potentially hazardous functions or control commands may be executed by means of the manual operator-control instrument 9 only when the manual operator-control instrument 9 is integrated into the control system 1 via the connecting cable 17, i.e. is attached to the control system 1 via a multi-pole electrical cable connection or via a multi-plicity of cable wires. In particular, it is possible thereby to route the switching or safety functions of the safety switching element 15 via the multi-pole connecting cable 17 and thus to achieve a disconnection function that is highly available or particularly reliable and substantially free of time delay by means of the safety switching element 15.

For the case that the manual operator-control instrument 9 is being used in its purely wireless mode of operation (wireless mode), i.e. is integrated into the control system 1 exclusively via its wireless communication interface 16, mainly only observational functions or uncritical control functions are available to the operator-control person 11 by means of the manual operator-control instrument 9. Beyond this, a so-called hybrid function may be provided in the control system 1, by which the manual operator-control instrument 9 may be placed into a hard-wired state (cable mode), in which the functions of the safety switching element 15 are also available with high reliability. In contrast to this, in a purely wireless mode of operation (wireless mode) of the manual operator-control instrument 9, the functions of the manual operator-control instrument 9 are limited to observational and visualization functions. In case of a purely wireless connection (wireless mode) of the manual operator-control instrument 9 to the control system 1, the functionality of a safety switching element 15 would indeed be likewise theoretically implementable, but the necessary technical outlay for achievement of an availability that is as high as possible with simultaneous functional safety of a wirelessly coupled safety switching element 15 is relatively high and thus complex or cost-intensive. Accordingly, in the case of the specified control system 1, it is not intended to integrate the functionality of the safety switching element 15 wirelessly into the control system 1. Instead, a "hybrid function" or a "semi-wireless functionality" of the manual operator-control instrument 9 is provided, wherein the changeover between "wireless mode" and "cable mode"—and conversely—is controlled or regulated by the internal control device 10 among other possibilities.

The at least one safety switching element 15, actuatable by an operator-control person 11, on the manual operator-control instrument 9, may be formed by a so-called Emergency Off switch and/or a three-stage enabling switch with so-called panic switch position. Such a safety switching element 15—as known itself—is provided for the execution and/or termination of control commands or movement sequences of the technical installation 2 that are potentially critical to safety.

The at least one safety switching element 15 is integrated into at least one electrical safety switching circuit 19 of the control system 1 or of the technical installation 2. In order to conform with pertinent standards, this safety switching circuit 19 may be constructed redundantly with two circuits. In the case of relatively relaxed safety requirements, however, it may also be constructed as a single circuit. The safety switching circuit 19 is closed in the quiescent or normal state, being constructed in particular as an uninterrupted, electrical conduction path or as a safety loop. Upon occurrence of a potentially hazardous state, the safety switching circuit 19 can be transferred into an interrupted or opened state. This is accomplished by actuation or activation of at least one of the safety switching elements 15. Such a safety switching element 15 that can be actuated by an operator-control person 11 as needed comprises at least one, preferably two normally closed contacts that are constructed redundantly and in positively opening manner. Typically, several safety switching elements 15 disposed in distributed manner at favorably reachable positions of the technical installation 2 are provided in the form of so-called Emergency Off switches. In the opened or interrupted state of at least one of the safety switching circuits 19, a disconnection of potentially hazardous movements or sequences of the technical installation 2 is provided, or a safe state of a technical installation 2 is established when the at least one safety switching circuit 19 is activated via at least one safety switching element 15, and in particular is transferred into the interrupted state.

As is best seen by consideration of FIGS. 1 and 2 together, the hard-wired communication interface 18 using control technology is provided with a contact-based plug interface 20 on the manual operator-control instrument 9. By means of this plug interface 20, the cable connection between the manual operator-control instrument 9 and the control system 1 or one of the control devices 7 may be established and canceled as necessary. This plug interface 20 comprises a first coupling element 21, for example a plug socket on the manual operator-control instrument 9, especially on the housing thereof, and a second coupling element 22, which can be coupled and decoupled relative to the first coupling element 21 as needed and which corresponds with the first coupling element 21. The second coupling element 22, which may be constructed in the form of a plug, is then constructed at one of the two ends of the connecting cable 17.

According to one practical embodiment, it may be provided that the second end of the connecting cable 17, especially the end of the connecting cable 17 remote from the manual operator-control instrument 9, is also constructed such that it can be coupled and decoupled as needed. In particular, a second plug interface 23 may be provided for plugging and unplugging relative to the control system 1 as needed in a manner that can be achieved without tools, especially relative to at least one of the stationary control devices 7. For this purpose, the second plug interface 23 comprises—as known in itself—a cable plug 24 on the connecting cable 17 and at least one plug socket 25 corresponding thereto at suitable positions of the control system 1 or on the diverse stationary control devices 7. Inasmuch as at least one plug interface 23 is provided on the installation side, this is preferably actuatable without tools, just as the plug interface 20, on the instrument side, to the manual operator-control instrument 9. It must be pointed out in this connection that at least the interface 23 situated closest to the technical installation 2 may also be constructed permanently, especially undetachably, by attaching the connecting cable 17 directly to the respective control device 7 and joining it undetachably thereto.

Inasmuch as at least one second plug interface 23 is implemented, it may be provided that a coupling-state detecting means 26 for automated sensing of the presence or non-presence of the cable plug 24 at the plug interface 23 is provided on the stationary control device 7 or at a corresponding coupling point.

In order to improve the control system 1 or in order to optimize the operation of the technical installation 2 or of the control system 1, at least one termination indicator 27 that can be sensed electronically or by sensors is formed directly on or in the second coupling element 22 and/or in the immediate vicinity of the second coupling element 22, especially on or in the most closely situated, associated end portion of the connecting cable 17. This termination indicator 27 can be sensed electrotechnically or electronically and thus detected in automated manner with respect to its presence or with respect to its characteristic or nature. For this purpose, an electronic termination-indicator detecting means 28 is provided. This termination-indicator detecting means 28 may be part of a monitoring electronic unit 29 implemented, using software and/or hardware technology, in the control system 1 or in at least one of the stationary control devices 7. Typically, the termination-indicator detecting means 28 or a corresponding monitoring electronic unit 29 is implemented externally or remote from the control device 10 of the manual operator-control instrument 9.

By means of this termination-indicator detecting means 28, it is possible to sense in automated manner whether the connecting cable 17 is present with some probability in an orderly or planned state, especially whether the planned line connections up to the second coupling element 22 of the connecting cable 17 are present with highest probability. For the case that this termination indicator 27 is not sensed or is sensed in a non-orderly characteristic, it is assumed on the part of the monitoring electronic unit 29 or on the part of the termination-indicator detecting means 28 that the connecting cable 17 is damaged, severed or partly severed, or for some other reasons is not available and thus an unplanned state is present that may possibly be critical to safety. In particular, it may thereby be recognized in automated or partly automated manner by the control system 1 or by at least one of the control devices 7 whether a planned, connection via the connecting cable 17, starting from the stationary control device 7 in the direction of the manual operator-control instrument 9—and conversely—is present or presumably can be established and whether, in the case to the contrary, a safe shutdown or initiation of Emergency Off can be undertaken via the safety switching element 15 on the manual operator-control instrument. However, an important effect of this feature lies in the fact that thereby it is possible simply and reliably to distinguish, in automated manner, between an intentional separation of the communication connection 8' via the connecting cable 17 and a fault-induced interruption, for example an accident-induced cut of the connecting cable 17 or a wire break.

The termination indicator 27 is then to be understood as an identifier or as a feedback element at the end of the connecting cable 17 that can be associated with the manual operator-control instrument 9. In the simple case, the termination indicator 27 that can be sensed electronically or by sensors is formed by an electrical connecting jumper 30 or by a defined ohmic resistor. A corresponding termination indicator 27 may then be attached between two wires of the connecting cable 17 or alternatively between one wire and an electromagnetic shield, especially a shield braid or a shield foil, of the connecting cable 17. The jumper 30 or the termination indicator 27 may then function as an electrical bridge.

However, the termination indicator 27 that can be detected in automated manner or electrotechnically may also be formed by at least one electrical part with frequency-dependent or nonlinear properties, for example by inductors or capacitors, especially by electrical filters. Alternatively, an active transmitting device for electrical signals is also conceivable, which is attached to a wire or an electromagnetic shield of the connecting cable 17. Upon reception of adequate transmission or response signals, which are transmitted by a corresponding termination indicator 27, it may be assumed by the monitoring electronic unit 29, especially by the termination-indicator detecting means 28, that the cable connection, starting from the control device 7 in the direction of the second coupling element 22 on the connecting cable 17, is in order, and thus an orderly system state may be assumed. For an increase in the safety, a redundant arrangement of two or more substantially identical termination indicators 27 may also be provided.

It is then expedient when the respective termination indicator 27 is permanently or in principle undetachably joined to the second coupling element 22 or to the most closely situated associated end of the connecting cable 17. In particular, it is provided that the respective termination indicator 27 is disposed on or in the second coupling element 22 in a manner that is not detachable for an operator-control person 11 or for a standard user or is permanently joined to the connecting cable 17. This may be done, for example, by soldered or clamped connections or by screw connections, which in principle are inaccessible. Thereby it is ensured that, in customary or standard application situations, a removal or detachment of the termination indicator 27 from that end portion of the connecting cable 17 which is provided for coupling and decoupling relative to the manual operator-control instrument 9 as needed is prevented.

The termination indicator 27 is preferably implemented in such a way that, starting from at least one of the stationary control devices 7 or from the implemented monitoring electronic unit 29, it is possible to sense, especially by means of the termination-indicator detecting means 28, when the contact-based plug interface 20 between the connecting cable 17 and the manual operator-control instrument 9 is separated or inactive. Thus the termination indicator 27 is active or detectable even when the second coupling element 22 is withdrawn from the manual operator-control instrument 9. This means that the contact-based interface 20 may be separated and in the process the termination indicator 27 continues to be identifiable when the line connections between the control device 7 and the coupling element 22 are intact or at least the respective wires to which the termination indicator 27 is attached are in order. Accordingly, the respective passively or actively working termination indicator 27 is detectable even when the connecting cable 17 is unplugged or has been unplugged from the manual operator-control instrument 9 and, moreover, an expected orderly or planned functional state of the connecting cable 17 or of the second coupling element 22 and/or of a possibly formed second plug interface 23 exists.

In combination with or in addition to the said termination-indicator detecting means 28, the control system 1 or at least one of the stationary control devices 7, especially the implemented monitoring electronic unit 29, comprises a manual operator-control instrument detecting means 31. This manual operator-control instrument detecting means 31 is used for sensing the presence or non-presence of a connection, using control technology, or a manual operator-control instrument 9 to the control system 1 or to one of the stationary control devices 7. The manual operator-control instrument detecting means 31 may then be implemented using software and/or hardware technology and in the process be constructed either in the control device 7 or in a corresponding monitoring electronic unit 29.

The manual operator-control instrument detecting means 31 may be implemented simply by a current measurement, especially may take place by a determination of the electrical energy consumption. Alternatively or in combination therewith, the manual operator-control instrument detecting means 31 may also be defined by a means, using software technology, which evaluates or observes the communication using data or signal technology via the connecting cable 17. In cases in which the electrical energy consumption or the communication, using data technology, via the connecting cable 17 drops below a certain threshold value or becomes zero, it may be assumed on the part of the manual operator-control instrument detecting means 31 that no manual operator-control instrument 9 is attached to the second coupling element 22. In particular, it is possible to recognize, with such a manual operator-control instrument detecting means 31, whether the second plug interface 20 is or has been separated, especially whether the second coupling element 22 has been detached from the manual operator-control instrument 9, by the fact that it has been removed from the corresponding coupling element 21.

A current-measuring unit 32, implemented preferably in the individual coupling points, especially in the control devices 7, is then provided either for measurement or for basic detection of an electrical current conducted via a supply wire 33 of the connecting cable 17. In the process, the presence of a current flow or of a noteworthy current flow may be detected by the current-measuring unit 32 only when the manual operator-control instrument 9 is properly attached to the control system 1, especially when the coupling element 22 on the connecting cable 17 has been coupled properly with the corresponding coupling element 21 on the manual operator-control instrument 9. In the case of a separation of the corresponding plug interface 20 undertaken by the operator-control person 11, the current flow via the supply wire 33 becomes zero or almost zero, and so it is possible to draw the conclusion of a cancellation of the connection to the manual operator-control instrument 9.

What is then important is that, by a combinatorial evaluation of the results of the termination-indicator detecting means 28 and of the manual operator-control instrument detecting means 31, a relatively reliable distinction can be made between intentionally or deliberately unplugged manual operator-control instrument 9 and a separation of or damage to the connecting cable 17 caused by faults.

According to an expedient construction, therefore, the control system 1 is designed such that the respective stationary control device 7 or the monitoring electronic unit 29 implemented in the control device 7, upon sensing of a non-presence of a manual operator-control instrument 9, especially during a change from a presence to a non-presence of a non-presence of a connection, using control technology, of a manual operator-control instrument 9, and upon simultaneous sensing of a termination indicator 27, recognizes, in automated manner, a separation, undertaken intentionally or actively by an operator-control person 11, of the contact-based interface 20 on the manual operator-control instrument 9, or assumes such using evaluation technology. Accordingly, bridging of the safety switching circuit 19 is undertaken, in the course of unplugging the manual operator-control instrument 9, by the stationary control device 7 or a corresponding monitoring electronic unit 29 as a substitute for the decoupled or from then on ineffective safety switching element 15 on the manual operator-control instrument 9 that is to be decoupled or has just been decoupled. This means that, in the case of presence of the said case states, the control system 1 acts or is programmed in such a way that the safety switching circuit 19, for example on the coupling point of the manual operator-control instrument 9, is transferred immediately into the closed state and so an unintended shutdown of the technical installation 2 on the basis of the deliberate or intentional unplugging of the manual operator-control instrument 9 is prevented. In particular, it may be provided that the control system 1 is provided in the said case states for the changeover from at least one substitute or parallel contact 34, 34' to the safety switching element 15 on the decoupled manual operator-control instrument 9. In particular, it may then be provided that, in the case of such decoupling of the manual operator-control instrument 9, recognized as intentional or planned, in which no emergency or hazardous state and also no fault state is present on the connecting cable 17, the substitute of parallel contacts 34, 34' constructed as normally closed contacts are transferred into the quiescent state, i.e. into the closed state, in order to avoid an unwanted shutdown of the technical installation 2 or of installation components 3. This substitute bridging of the safety switching circuit 19 by the control device 7 or by the monitoring electronic unit 29 and the continuation of the electrically closed state of the safety switching circuit 19 associated therewith is ensured in particular when the safety switching element 15 on the manual operator-control instrument 9 has been preset to its quiescent state, i.e. was not actuated, immediately before the unplugging of the connecting cable 17 from the manual operator-control instrument 9.

Conversely, such a substitute or parallel contact 34, 34' in the safety switching circuit 19 would be placed into the opened state or would remain in the opened state when the safety switching element 15 on the manual operator-control instrument 9 has been or was actuated before the connecting cable 17 is unplugged. This disconnected state thus continues to persist in this case even when the operator-control person 11 separates the manual operator-control instrument 9 from the connecting cable 17, especially unplugs the second coupling element 22 from the housing of the manual operator-control instrument 9 or withdraws it from the first coupling element 21.

It is expressly pointed out that the termination-indicator detecting means 28 and the coupling-state detecting means 26 may be integral parts of a corresponding monitoring electronic unit 29 or of the respective control device 7. These corresponding electronic detecting means may be implemented using hardware and software technology, or else be constructed using predominantly software technology.

Furthermore, it may be expedient when the termination-indicator detecting means 28 or the corresponding monitoring electronic unit 29 is designed for continuous, periodic, event-dependent or stochastic detection of the presence of system-compatible termination indicators 27. In particular, it should then be checked, in automated manner, at regular or irregular intervals, whether a compatible termination indicator 27 is present or whether such cannot be sensed. What is important in this connection is that the stationary control device 7 or the monitoring electronic unit 29 is provided at least for signaling a fault message, or the respective safety switching circuit 19 is placed in the disconnected or Emergency Off state when the manual operator-control instrument detecting means 31 indeed recognizes the connection of a manual operator-control instrument 9, even though the presence of a termination indicator 27 is not detectable by means of the termination-indicator detecting means. In such a case, faults in particular are present, which may be caused, for example, by a cable break or a wire break in the connecting cable 17. Alternatively or in combination therewith, incompatible or unscheduled connecting cables 17 can be recognized thereby.

It is also expedient when the at least one stationary control device 7 or the monitoring electronic unit 29 is designed for immediate termination of its bridging state with respect to the safety switching circuit 19 and for immediate functional or substitute integration, into the safety switching circuit 19, of the at least one safety switching element 15 on a manual operator-control instrument 9 that has just been or apparently is plugged in, when the connection of a manual operator-control instrument 9 is sensed by means of the manual operator-control instrument detecting means 31 and simultaneously a termination indicator 27 is sensed by means of the termination-indicator detecting means 28. This operation is expedient in particular during plugging of a manual operator-control instrument 9 together with an unactuated safety switching element 15 present in quiescent state.

When the at least one safety switching element 15 on the manual operator-control instrument 9 is functional integrated into the safety switching circuit 19 via separate line connections, by attaching the manual operator-control instrument 9 to the control system 1 by means of the connecting cable 17, the manual operator-control instrument 9 can be used for execution or influencing of potentially hazardous control commands. In particular, in the case of connection of the manual operator-control instrument 9 via the connecting cable 17, it is provided that an observation or execution of workflows or control commands potentially critical to safety is made possible by means of the manual operator-control instrument 9. In the process, the at least one safety switching element 15 of the manual operator-control instrument 9 is integrated functionally effectively into the safety switching circuit 19 of the technical installation 2 using the connecting cable 17, and its functional effectiveness is comparatively reliably available. Accordingly, the execution or controlling of potentially hazardous control tasks is possible in a so-called "cable mode" (cable mode), in which the manual operator-control instrument 9 is connected to the control system 1 by means of the connecting cable 17 and thus also the at least one safety switching circuit 15 is integrated into the control system 1 via wires of the connecting cable 17. In contrast, the manual operator-control instrument 9 or the control system 1 may also be operated in a pure "radio mode" (wireless mode), in which the connecting cable 17 is unplugged or is not present. This relatively unrestricted mobility in "wireless mode" contributes on the one hand to a particularly good visibility of the technical installation 2 for the operator-control person 11 and on the other hand, however, it likewise permits the influencing of operating states or the checking of operation states at great distance, i.e. without the need for the operating person to be directly on the spot. In this "wireless mode", in which the manual operator-control instrument 9 is integrated into the control system 1 exclusively by means of the wireless communication interface 16, the functions of the manual operator-control instrument 9 are preferably limited to observational functions using data technology or to parameter-assignment functions that are uncritical from the safety viewpoint. Thereby safety and reliability of the control system 1 can be optimized or a high safety standard may be established thereby.

In this connection, it may also be expedient when the control system 1 or the control device 10 makes an existing functional availability and/or an existing ineffectiveness of the at least one safety switching element 15 on the manual operator-control instrument 9 obvious for the operator-control person 11 or for other persons. In the process, it is expedient when the control system 1 signals an existing functional availability of the at least one safety switching element 15 on the manual operator-control instrument 9 by activation of an illuminant 35 of the at least one safety switching element 15. Preferably, this illuminant 35 is integrated in the interior of the safety switching element 15 and then at least sub-portions of the safety switching element 15 are constructed to be transparent or translucent. In this case it is expedient when the safety switching element 15 and its housing portion have a dark appearance in the non-illuminated and therefore inactive state or are provided with weakly translucent housing portions and, for example, have a milky gray appearance. In contrast, the safety switching element 15 in its functionally ready state is differently colored in its appearance, in particular is illuminated more brightly or from the interior.

In this connection, it is expedient when the illuminant 35, which can be activated and deactivated in dependence on the functional availability or functional ineffectiveness of the safety switching element 15, is designed for emission of preferably red-colored light when the safety switching element 15 is functionally ready, in particular is ready for disconnection or termination of potentially hazardous control or movement processes, i.e. a disconnection readiness for the technical installation 2 or for installation components 3 exists. To this extent, the control system 1 or a monitoring electronic unit 29' in the manual operator-control instrument 9 is designed for reliable deactivation of the illuminant 35 of the safety switching element 15 when the manual operator-control instrument 9 is integrated in the control system 1 exclusively via the wireless communication interface 16, i.e. via a radio link. The monitoring electronic unit 29' in the manual operator-control instrument 9, which may be implemented using software and/or hardware technology, may also be provided for situational activation of the illuminant 35, which may comprise at least one LED.

As already explained, the control system 1 may comprise control devices 7 disposed in distributed manner, as is illustrated by way of example in FIG. 1. These control devices 7 are provided for the implementation of primary control tasks within the technical installation 2. In this connection, it is expedient when the proposed control system 1 comprises at least one terminal control unit 36 that is structurally detached and in particular designed separately from the actual control devices 7. The at least one terminal control unit 36 is then hard-wired with at least one of the control devices 7 and serves for functional integration of the manual operator-control instrument 9 into the control system 1. It is expedient when a terminal control unit 36 is provided on each coupling point for integration of a manual operator-control instrument 9 into the control system 1. The terminal control unit 36 may then be constructed in particular as a standalone housing unit in the manner of a terminal box. It is then expedient when the monitoring electronic unit 29 is implemented, especially the termination-indicator detecting means 28 and/or the manual operator-control instrument detecting means 31 and/or the coupling-state detecting means 26 is implemented in this terminal control unit 36.

An expedient functional workflow in the control system 1 in the course of unplugging of the connecting cable 17 during the ongoing operation (hot unplugging) is presented as follows: The termination indicator 27 in the second coupling element 22, for example a wire jumper, is recognized by the terminal control unit 36 or the monitoring electronic unit 29. When the manual operator-control instrument 9 is unplugged at its plug interface 20 from the connecting cable 17, the following states are established: termination-indicator detecting means 28="True", coupling-state detecting means 26="True" and manual operator-control instrument detecting means 31="False". In this way, the corresponding local control device 7 or the terminal control unit 36 and/or the monitoring electronic unit 29 recognizes the intentional unplugging of the connecting cable 17 on the instrument side and goes into the bridged state relative to the safety switching circuit 19, in order to avoid an unwanted disconnection of the technical installation 2. Any cable break that occurred would then likewise be recognized: termination-indicator detecting means 28="False", manual operator-control instrument detecting means 31="False" and coupling-state detecting means 26="True".

A plugging operation of a manual operator-control instrument 9 during the ongoing operation of the control system 1 (hot plugging) takes place expediently as follows: When the stationary control device 7 and/or the monitoring electronic unit 29 or the terminal control unit 36 is in the bridged state relative to the safety switching circuit 19 and a manual operator-control instrument 9 having a safety switching element 15 is plugged in, the control system 1 recognizes this as follows: manual operator-control instrument detecting means 31="True", coupling-state detecting means 26="True" and termination-indicator detecting means 27="True". Accordingly, the bridged state is immediately canceled and the safety switching element 15 on the manual operator-control instrument 9 is at least functionally coupled or integrated in galvanically conducting manner into the safety switching circuit 19. If necessary, such a safety switching element 15 begins to light up, if such a safety switching element 15 is present on the manual operator-control instrument 9 with illuminant 35, which can be activated and deactivated. Thus its functional availability can be clearly signaled.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Control system
2 Installation
3 Installation component
4 Industrial robot
5 Processing station
6 Transport device
7 Control device
8 Wireless communication link
8' Hard-wired communication connection
9 Manual operator-control instrument
10 Control device 11 Operator-control person
12 Output element
13 Input element
14 Power supply unit
15 Safety switching element
16 Communication interface (wireless)
17 Connecting cable
18 Communication interface (hard-wired)
19 Safety switching circuit
20 Plug interface
21 First coupling element
22 Second coupling element
23 Second plug interface
24 Cable plug
25 Plug socket
26 Coupling-state detecting means
27 Termination indicator
28 Termination-indicator detecting means
29, 29' Monitoring electronic unit
30 Connecting jumper
31 Manual operator-control instrument detecting means
32 Current-measuring unit
33 Supply wire
34, 34' Substitute or parallel contact
35 Illuminant
36 Terminal control unit

The invention claimed is:

1. A control system (1) for technical installations (2), comprising
at least one stationary control device (7) with input and output interfaces for establishment of line connections to a technical installation (2) to be controlled,
at least one electronic manual operator-control instrument (9) that can be carried and used in mobile manner by an operator-control person (11) for influencing and observation of workflows and states, based on control technology, of the control system (1) or respectively of a technical installation (2) connected thereto,
which manual operator-control instrument (9) is provided with a wireless communication interface (16) using control technology and also a communication interface (18) that can be established using control technology via a connecting cable (17), with which communication interfaces (16, 18) an integration of the manual operator-control instrument (9) into the control system (1) using data technology is respectively possible,
at least one safety switching element (15) that can be actuated by an operator-control person (11) on the manual operator-control instrument, which safety switching element (15) is provided at least for a termination of control commands or movement sequences that are potentially critical to safety,
a safety switching circuit (19), which is closed in the normal state, which safety switching circuit (19) can be transferred into an interrupted or opened state for avoidance of a hazardous state and is provided for disconnection of potentially hazardous movements or sequences of an activated technical installation (2) or for establishment of a safe state in an activated technical installation (2),
and wherein the hard-wired communication interface (18) using control technology comprises a contact-based plug interface (20) on the manual operator-control instrument (9), which plug interface (20) is provided with a first coupling element (21) on the manual operator-control instrument (9) and a second coupling element (22) that can be coupled and decoupled as needed relative to the first coupling element (21), which second coupling element (22) is constructed on the connecting cable (17),
wherein
at least one termination indicator (27) is formed on or in the second coupling element (22) directly or in the immediate vicinity of the second coupling element (22) or on the connecting cable 17, which termination indicator (27) can be sensed electronically by a termination-indicator detecting means (28),
wherein a manual operator-control instrument detecting means (31) is formed, which is provided for sensing of the presence or non-presence of a connection, using control technology, of a manual operator-control instrument (9) to the control system (1),
and wherein the control system (1), upon sensing of a change from a presence to a non-presence of a connection, using control technology, of a manual operator-control instrument (9) and upon simultaneous sensing of a termination indicator (27) on the corresponding cable (17) to this decoupled manual operator-control instrument (9), recognizes a separation, undertaken intentionally by an operator-control person (11), of the contact-based interface (20) on this manual operator-control instrument (9) and thereupon, as a substitute for the safety switching element (15) that as a consequence has become ineffective on the decoupled manual operator control instrument (9), couples the last valid switched state of the safety switching element (15) in functionally equivalent manner into the safety switching circuit (19), or respectively is designed for bridging the safety switching circuit (19) in the course of unplugging the manual operator-control instrument (9), or is provided for changeover of at least one substitute or parallel contact (34, 34') to the safety switching element (15) on the manual operator-control instrument (9), inasmuch as the safety switching element (15) on the unplugged manual operator-control instrument (9) has been preset in its non-actuated state or quiescent state immediately before the unplugging of the connecting cable (17) from the manual operator control instrument (9).

2. The control system according to claim 1, wherein the termination-indicator detecting means (28) is provided for continuous, periodic or event-dependent detection of termination indicators (27), and wherein the control system (1) is provided for signaling of a fault message when the manual operator-control instrument detecting means (31) recognizes the connection of a manual operator-control instrument (9) but the presence of a termination indicator (27) is not detectable by the termination-indicator detecting means (28).

3. The control system according to claim 1, wherein the control system (1) is designed for immediate termination of its bridging state with respect to the safety switching circuit (19) and for substitute, immediate integration of the at least one safety switching element (15) on an apparently plugged-in manual operator-control instrument (9) into the safety switching circuit (19) of the control system (1), when the connection of a manual operator-control instrument (9) is sensed by means of the manual operator-control instrument detecting means (31) and a termination indicator (27) is sensed by means of the termination-indicator detecting means (28).

4. The control system according to claim 1, wherein the termination indicator (27) is formed by an electrical connecting jumper (30) or an ohmic resistor between two wires of the connecting cable (17) or alternatively between one wire and an electromagnetic shield of the connecting cable (17).

5. The control system according to claim 1, wherein the termination indicator (27) is formed by at least one electrical part with frequency-dependent or nonlinear characteristics or by a transmitting device for electrical signals on a wire or an electromagnetic shield of the connecting cable (17).

6. The control system according to claim 1, wherein the termination indicator (27) is permanently joined to the second coupling element (22) or the connecting cable (17).

7. The control system according to claim 1, wherein the termination indicator (27) can be sensed or is active even when the contact-based plug interface (20) is separated and the manual operator-control instrument (9) is unplugged from the connecting cable (17).

8. The control system according to claim 1, wherein a second plug interface (23) is provided for plugging and unplugging of a cable plug (24) of the connecting cable (17) as needed in a manner that can be executed without tools.

9. The control system according claim 8, wherein a coupling-state detecting means (26) is provided for sensing of the presence or non-presence of the cable plug (24) on the second plug interface (23).

10. The control system according to claim 1, wherein the control system (1) comprises control devices (7), which are disposed in distributed manner and which are provided for the implementation of primary control tasks, and wherein at least one terminal control unit (36), structurally detached from the control devices (7), hard-wired with at least one control device (7), is designed for integration of the manual operator-control instrument (9) into the control system (1).

11. The control system according to claim 10, wherein the termination-indicator detecting means (28), the manual operator-control instrument detecting means (31) and the coupling-state detecting means (26) are implemented in the terminal control unit (36).

12. The control system according to claim 1, wherein the manual operator-control instrument (9) can be used for execution or influencing of potentially hazardous control commands when the manual operator-control instrument (9) is integrated into the control system (1) by means of the connecting cable (17) and the at least one safety switching element (15) of the manual operator-control instrument (9) is integrated functionally effectively into the safety switching circuit (19).

13. The control system according to claim 1, wherein the control system (1) restricts the functions of the manual operator-control instrument (9) to observational functions using data technology or to parameter-assignment functions that are uncritical from the safety viewpoint, when the manual operator-control instrument (9) is integrated into the control system (1) exclusively by means of the wireless communication interface (16).

14. The control system according to claim 1, wherein the control system (1) signals an existing functional availability of the at least one safety switching element (15) on the manual operator-control instrument (9) by activation of an illuminant (35) of the at least one safety switching element (15).

15. The control system according to claim 14, wherein the control system (1) is designed for deactivation of the illuminant (35) of the safety switching element (15) when the manual operator-control instrument (9) is integrated into the control system (1) exclusively via the wireless communication interface (16).

* * * * *